(12) United States Patent
Khansari et al.

(10) Patent No.: US 6,829,741 B1
(45) Date of Patent: Dec. 7, 2004

(54) FORWARD ERROR CORRECTION (FEC) BASED ON SONET/SDH FRAMING

(75) Inventors: Masoud Khansari, Sunnyvale, CA (US); Alireza Abaye, Fremont, CA (US)

(73) Assignee: Centillium Communications, Inc., Fremont, CA (US)

( * ) Notice: Subject to any disclaimer, the term of this patent is extended or adjusted under 35 U.S.C. 154(b) by 613 days.

(21) Appl. No.: 10/003,029

(22) Filed: Oct. 23, 2001

Related U.S. Application Data

(60) Provisional application No. 60/308,904, filed on Jul. 27, 2001.

(51) Int. Cl.[7] .......................... H03M 13/00; G06F 11/00
(52) U.S. Cl. ........................................ 714/755; 714/701
(58) Field of Search ................................ 714/701, 752, 714/755, 758, 800, 704; 711/127, 157

(56) References Cited

U.S. PATENT DOCUMENTS

| | | | | |
|---|---|---|---|---|
| 6,622,277 B1 | * | 9/2003 | Ramanujam et al. | 714/755 |
| 6,643,331 B1 | * | 11/2003 | Farrell et al. | 375/261 |
| 6,658,605 B1 | * | 12/2003 | Yoshida et al. | 714/702 |
| 6,697,993 B1 | * | 2/2004 | Lopez | 714/786 |

OTHER PUBLICATIONS

Sonet.com web pages. "Welcome to the Sonet Home Page" pp. 1–2 [online] [retrieved on Oct. 2, 2001]. Retrieved from the Internet: >URL: http: http://www.sonet.com/≦.
International Telecommunication Union, Series G: Transmission Systems and Media, Digital Systems and Networks, Digital transmission systems—Digital sections and digital line system—Optical fibre submarine cable systems, "Forward error correction for submarine systems," (17 pages), (11/96).
International Telecommunication Union, Series G: Transmission Systems and Media, Digital Systems and Networks, Digital transmission systems—Digital networks—Optical transport networks, "Architecture of optical transport networks," (37 pages), (02/99).
International Telecommunication Union, Series G: Transmission Systems and Media, Digital transmission systems—Terminal equipments—General, "Network node interface for the synchronous digital hierarchy (SDH)," (139 pages) (03/96).
"Digital Hierarchy—Formats Specifications," American National Standards Institute, N. Y., N.Y., (108 pages), © 1995 by Alliance for Telecommunications Industry Solutions.
"Synchronous Optical Network (SONET) Transport Systems: Common Generic Criteria (A Module of TSGR, FR–440)," Telecordia Technologies, pp. i—3–84, Issue 3, Sep. 2000.
"Sonet Telecommunications Standard Primer," Tektronix, 08/01, © 2001, (39 pages).
"Synchronous Optical Network (SONET)—Basic Description including Multiplex Structure, Rates, and Formats," American National Standards Institute, N. Y., N.Y., (91 pages) © 1995 by Alliance for Telecommunications Industry Solutions.
ITU—Telecommunication Standardization Sector, Temporary Document 9(PLEN), "Draft New Recommendation G.709 For Approval," pp. 1–85, Geneva, Feb. 5–9, 2001.

* cited by examiner

*Primary Examiner*—Christine T. Tu
(74) *Attorney, Agent, or Firm*—Fenwick & West LLP

(57) ABSTRACT

Techniques for applying FEC to optical signals such as synchronous transport signal level N SONET frames, as well as other frame structures (e.g., synchronous transport module level N SDH frames) are provided.

21 Claims, 13 Drawing Sheets

| A1 - Framing | A2 - Framing | J0 - Trace |
|---|---|---|
| B1 – BIP -8 | E1 - Orderwire | F1 - User |
| D1 – Data Com | D2 – Data Com | D3 – Data Com |
| H1 - Pointer | H2 - Pointer | H3 – Pointer Action |
| B2 – BIP -8 | K1 - APS | K2 - APS |
| D4 – Data Com | D5 – Data Com | D6 – Data Com |
| D7 – Data Com | D8 – Data Com | D9 – Data Com |
| D10 – Data Com | D11 – Data Com | D12 – Data Com |
| S1 – Sync Status | M0 or M1 – REI -L | E2 - Orderwire |

Transport Overhead

Section Layer Overhead (rows 1–3)
Line Layer Overhead (rows 4–9)

BIP – Bit Interleaved
APS – Automatic Protection

Figure 3
(prior art)

FORWARD ERROR CORRECTION (FEC) BASED ON SONET/SDH FRAMING

RELATED APPLICATIONS

This application claims the benefit of U.S. Provisional Application No. 60/308,904, filed Jul. 27, 2001, which is herein incorporated in its entirety by reference.

FIELD OF THE INVENTION

The invention relates to communication systems, and more particularly, to techniques for applying forward error correction to frames of a synchronous optical communication system.

BACKGROUND OF THE INVENTION

In general, the noise associated with a communication channel can cause transmission errors. The error probability of a digital communication system is the number of errors per total number of bits received. For instance, if one error bit per 100 bits occurs, the error probability is $\frac{1}{100}$, or $10^{-2}$. Forward error correction (FEC) techniques, such as Reed-Solomon or BCH encoding, employ the concept of redundancy in order to maintain an acceptable error rate. In this context, redundancy is the fraction of total message content that can be eliminated without loss of essential information. A FEC code is an encoding algorithm that uses more signal elements (e.g., redundant bits) than necessary to represent the essential information to be communicated. The intended receiver can decode the transmitted information (including both essential information and redundant elements) using a complementary FEC decoding algorithm to recover the intrinsic information. By using redundancy, the probability of error is spread out over a greater number of signal elements, and a more robust communication is generally achieved.

FEC and Optical Transmission

Historically, the use of forward error correction (FEC) in the context of transmitting optical signals has been limited. FEC has been used, for instance, in submarine systems to decrease the number of necessary 3R (re-time, re-shape, re-transmit) regenerators for transoceanic transmission of optical signals. Recommendation G.975 of the Telecommunications Standards Section of the International Telecommunication Union (ITU-T) addresses this particular application. FEC is also being used in the context of dense wavelength division multiplexing (DWDM) optical systems. By using FEC in such systems, it is possible to increase the number of the transmitted colors significantly thereby resulting in an increase in the overall transmission rate of the optical system.

Recommendation G.975 Coding

Recommendation G.975 defines the architecture of an encoder. The encoder produces FEC frames. A digital de-multiplexer and a multiplexer are used before and after the encoding stage, respectively. The multiplexer effects the interleaving operation. The de-multiplexer, on the other hand, provides a complementary de-interleaving operation needed for data integrity. The corresponding decoder architecture uses the same digital multiplexer and digital de-multiplexer. The input of the decoder is passed through a de-multiplexer to implement de-interleaving stage resulting in N parallel signals. After passing these signals through a bank of N RS decoders, they are multiplexed back to the original signal. A typical value for N, for example, is 16 corresponding to an interleaving of depth sixteen.

In applying Recommendation G.975, a coding gain of about 6 dB can be achieved. This coding gain translates into transforming a signal with a bit error ratio (BER) of about $10^{-4}$ to a signal with a BER of about $10^{-15}$. The input signal to the encoder is a multiple of STM-16 (synchronous transport module level 16) where each STM-16 is processed in parallel. A SMT-16 frame has a bit rate of 2.48832 gigabits-per-second (Gbps). The input signal (referred to as payload or STM-16 data) is first segmented into blocks of 238 bytes each. After adding an overhead byte, the resultant 239 bytes are passed through a Reed-Solomon (255,239) encoder thereby generating FEC frames of 255 bytes each. Based on the properties of Reed-Solomon (RS) redundancy codes, the added 16 bytes of parity can correct up to eight erroneously received byte-symbols within that FEC frame.

If the number of byte-symbols in error in a received FEC frame is greater than eight, then the decoder is not able to correct the errors and decoding failure is declared. To reduce such "burst errors," it is therefore necessary to use interleaving where bytes from each FEC frame are spread during transmission so that the probability of receiving more than eight bytes in error for each FEC frame is minimized. Recommendation G.975 proposes blocks of N consecutive FEC frames where the first column of the frames is transmitted first followed by the second column, and so on. Using an interleaving of depth N, it is possible to correct burst error lengths of up to 8N bytes. The penalty paid for this error correction capability is the extra 255*N bytes of delay introduced by the interleaver.

Optical Transport Network (OTN)

In general, optical networks operate to provide transport, multiplexing, routing, supervision, and survivability of client signals that are processed in the physical domain. The optical transport network (OTN) initiative of the ITU-T (as well as the T1X1.5 technical subcommittee) uses the extra overhead byte added to each FEC frame to propose a new digital hierarchy (e.g., ITU-T G.709) and the corresponding network architecture (e.g., ITU-T G.872). To form an OTN frame, the interleaving depth is set to 16 to arrive at a FEC super-frame. This super-frame has 16 bytes of overhead followed by 3808 bytes of payload. The tail end of this super-frame includes 256 parity bytes. Four super-frames are used to form an OTN frame. The OTN frame is defined for three different line rates k (where k=1, 2 and 3, corresponding to line rates of 2.5, 10 and 40 Gbps, respectively). Note that the format of an OTN frame is the same for all the line rates, but the frame rate depends on the line rate. For purposes of clarity, this line rate k is distinct from and not to be confused with the pre-encoding block length k, which is used in reference to the selected coding algorithm.

Synchronous Optical Network (SONET)

One type of client signal in an OTN is generally referred to as synchronous optical network (SONET). SONET is defined by a set of American National Standards Institute (ANSI) standards defining the rates and formats for synchronous optical networks. Such standards include ANSI T1.105, ANSI T1.106 and ANSI T1.117. In addition, Telecordia Technologies' GR-253-CORE standard provides generic requirements on SONET transport systems. Similar standards, referred to as Synchronous Digital Hierarchy (SDH), have been established by the ITU-T (e.g., G.707). Note that SONET and SDH are technically compatible standards having differences that are readily understood by one skilled in the art. The SONET frame rate is always the same (e.g., 8000 frames/sec) regardless of the line rate.

SONET's synchronous, flexible, optical hierarchy allows many signals of different capacities to be carried by a transmission system. This is accomplished by a byte-interleaved multiplexing scheme. Generally, byte-interleaving simplifies multiplexing, and facilitates end-to-end network management. The first step in the SONET multiplexing process involves the generation of the lowest level or "base" signal. In SONET, this base signal is referred to as synchronous transport signal level-1 (STS-1).

The STS-1 signal operates at a bit rate of 51.84 Megabits per second (Mbps). The bit rate of each of the higher level signals is the signal integer level number multiplied by 51.84 Mbps. Thus, a hierarchal family of STS-N signals provided as illustrated by Table 1. An STS-N signal is formed from N byte-interleaved STS-1 signals. The base signal for a SDH system is referred to as synchronous transport module level-1 (STM-1), which has a bit rate of 155.52 Mbps. The hierarchal family of STM-M signals is also illustrated by Table 1. Note that N typically ranges from 1 to 192, where only particular values are recognized (e.g., 1, 3, 12, 48, and 192). However, higher values of N, as well as other recognized values are possible. Note the relationship of M to N (M equals N divided by 3).

TABLE 1

SONET STS Hierarchy

| Signal | Bit Rate | Capacity |
|---|---|---|
| STS-1, OC-1 | 51.840 Mbps | 28 DS1s or 1 DS3 |
| STS-3, OC-3, STM-1 | 155.520 Mbps | 84 DS1s or 3 DS3s |
| STS-12, OC-12, STM-4 | 622.080 Mbps | 336 DS1s or 12 DS3s |
| STS-48, OC-48, STM-16 | 2488.320 Mbps | 1344 DS1s or 48 DS3s |
| STS-192, OC-192, STM-64 | 9953.280 Mbps | 5376 DS1s or 192 DS3s |
| STS-768, OC-768, STM-256 | 39813.12 Mbps | 21504 DS1s or 768 DS3s |

As can be seen in Table 1, each of the digital signals (e.g., DSn) received by a SONET system is associated with a particular bit rate which dictates how many of that signal type can be associated with a particular STS level including necessary overhead added by the SONET system. The digital signal received by the SONET system is generally referred to as payload. The optical form of each STS-N signal is referred to as OC-N (the optical carrier signal for that level). The STS and OC signals of any one level have the same bit rate. Note that SDH systems do not distinguish between the logical signal (STM-M) and the physical signal (OC-M). As the definition of STS-1 effectively defines the entire hierarchy of synchronous optical signals, the discussion of FIG. 1 is presented in terms of STS-1. The bit rate of a higher level STS-N signal is equal to N times the rate of STS-1. Similarly, the bit rate of an STM-M of a SDH system is equal to M times the bit rate of the STM-1 signal.

Generally, an STS-N signal includes two parts: the STS payload and the STS overhead. The STS payload carries the information portion of the signal, and the STS overhead carries signaling and protocol information. As a transmission signal enters a SONET system, that signal is converted from its current user format to STS format. The terminating equipment of the SONET's receiving node converts the STS-N signal back to the original user format. Note that synchronous transport module level 1 (STM-1) is the lowest bit rate signal for SDH at 155.52 Mbps, which happens to be equivalent to STS-3.

General Overview of SONET System

FIG. 1 illustrates a conventional SONET system. The terminating equipment designated with an "a" (e.g., 105a, 110a, 115a) represent a transmitting node of the SONET system, and the terminating equipment designated with a "b" (e.g., 105b, 110b, 115b) represent a receiving node of the SONET system. In this sense, an end-to-end SONET system is illustrated. The payload is received by the PTE 105a. The payload can be, for example, DS1, DS2, DS3, DS4NA, video or other digital service signals (whether synchronous or asynchronous). For purposes of discussion, assume that the payload is made up of 28 DS1 signals, each DS1 signal having a bit rate of 1.544 Mbps for a total bit rate of 43.232 Mbps. PTE 105a maps the DS1 signals and added path overhead into a format required by the line layer. This format is referred to as a synchronous transport signal level 1 synchronous payload envelope (STS-1 SPE). The STS-1 SPE is provided to the LTE 110a. The LTE 110a maps the STS-1 SPE and added line overhead into a line layer signal. This resulting line layer signal is then provided to the STE 115a of the section layer, which maps the line layer signal and added section overhead into an STS-1 signal. The output STE 115a is a logical signal, which can be converted to its physical equivalent (e.g., an optical signal or OC-1) for communication over the communication channel.

The receiving node essentially provides complementary functions to those of the transmitting node. Assuming the signal was transmitted in its physical form, it is converted back to its logical form (e.g., STS-1) at the physical layer. At the section layer, the STS-1 signal is then de-mapped by STE 115b into section layer signal and section overhead. At the line layer, the section layer signal is de-mapped by the LTE 110b into the SPE and line overhead. At the path layer, the SPE is de-mapped by the PTE 105b into the payload (and path overhead) that was originally received by PTE 105a Path Terminating Equipment and Path Layer PTE 105a and 105b are network elements that originate (105a) and terminate (105b) payload channels such as DSn channels. Additionally, PTE 105a and 105b can originate, access, modify, terminate or otherwise process the path overhead, or can perform any combination of these actions. Path overhead is assigned to and transported with the payload until the payload is de-multiplexed. Generally, path overhead supports functions that are necessary to transport the payload, such as performance monitoring and automatic protection switching. Virtual container path overhead is the equivalent for a SDH system. The path layer, therefore, facilitates the reliable transport of payloads between PTE 105a and 105b. In addition, the path layer maps payloads into the format required by the line layer. The path layer communicates end-to-end by virtue of the path overhead, and provides error monitoring and connectivity checks. Note that PTE 105a and 105b are implemented in conventional technology, such as fiber optic terminating systems.

Line Terminating Equipment and Line Layer

LTE 110a and 110b are network elements that originate (110a) and terminate (110b) line signals. Additionally, LTE 110a and 110b can originate, access, modify, terminate or otherwise process the line overhead, or can perform any combination of these actions. Generally, line overhead supports functions such as locating the SPE in the frame (synchronization), multiplexing or concatenating signals, performance monitoring, automatic protection switching, and line maintenance. LTE 110a and 110b are implemented in conventional technology, such as add/drop multiplexers or digital cross-connect systems. The line layer (also referred to as the multiplex section), therefore, facilitates the reliable transport of path layer payload and its overhead across the physical communication channel. All lower layers (e.g., section layer) exist to provide transport for this layer. Synchronization and multiplexing functions are also provided for the path layer.

Section Terminating Equipment and Section Layer

STE 115a and 115b are network elements that originate (115a) and terminate (115b) section signals such as STS-N or OC-N signals. Additionally, STE 115a and 115b can originate, access, modify, terminate or otherwise process the section overhead, or can perform any combination of these actions. Generally, section overhead supports functions such as framing, scrambling, performance monitoring, and section maintenance. STE 115a and 115b are implemented in conventional technology, such as 3R regenerators. The section layer (also referred to as the regenerator section), therefore, facilitates the reliable transport of an STS-N (or OC-N or STM-M) frame across the physical communication channel. This layer uses the physical layer for transport. Functions of this layer include framing, scrambling, section error monitoring, and section level communications overhead (e.g., local orderwire).

FIG. 2 illustrates the operation of a SONET system having transmitting and receiving nodes, and a repeater to regenerate the transmitted signal. The repeater is an STE node that only terminates the section layer, and its purpose is to perform 3R regeneration as well as performance line monitoring.

Transport Overhead Byte Designations of SONET System

With the optical interface layers hierarchy of a SONET system in mind, it is now appropriate to consider the overhead associated with these layers. FIG. 3 illustrates the transport overhead byte designations of a SONET system in accordance with the ANSI T1.105 standard, which is herein incorporated by reference in its entirety. In general, the functions assigned to the section and line layers are combined into a structure of 27 bytes called the transport overhead. Each of the bytes is assigned to a particular functional layer and a position in the overhead columns of the STS-1 frame. Typically, nine of the 27 bytes are overhead for the section layer, 18 bytes are overhead for the line layer, and the transport overhead occupies the first three columns of the STS-1 frame. The overhead associated with a given layer is modified, created or otherwise processed by the equipment associated with that layer before that overhead is inserted in the outgoing signal.

Section Layer Overhead Bytes

The framing bytes A1 and A2 are allocated in each STS-1 for framing. Note these framing bytes are not scrambled thereby allowing the individual frames to be identified at the receiving node. The section Trace byte J0 (in the first STS-1 of the STS-N) is generally used to send section trace messages. The section BIP-8 (bit interleaved parity-8) byte B1 is located in the first STS-1 of an STS-N, and is used for a section error monitoring function. The Orderwire byte E1 is located in the first STS-1 of an STS-N, and is used for a Local Orderwire (LOW) channel. A LOW channel is used for voice communication between regenerators, hubs and remote terminal locations. The section User Channel byte F1 is located in the first STS-1 of an STS-N, and is used by the network provider. The section Data Communication Channel bytes D1, D2 and D3 are located in the first STS-1 of an STS-N, and are used for section data communications. These three bytes effectively provide a message-based channel (192 kilobits per second) for alarms, maintenance, control, monitoring, administering and other communication needs between section terminal equipment. This channel is used for communicating internally generated, externally generated and supplier-specific messages.

Line Layer Overhead Bytes

The payload pointer bytes H1 and H2 are allocated to a pointer that indicates the offset in bytes between the pointer and the first byte of the STS SPE. The pointer bytes are typically used in all STS-1s within an STS-N to align the STS-1 transport overheads in the STS-N, and to perform frequency justification. These bytes can also be used to indicate concatenation, and to detect path Alarm Indication Signals (AIS-P). The Pointer Action byte H3 is allocated for SPE frequency justification purposes. The H3 byte is used in all STS-1s within an STS-N to carry the extra SPE byte in the event of a negative pointer adjustment. The line BIP-8 byte B2 is allocated in each STS-1 for a line error monitoring function. Generally, the N line BIP-8 bytes in an STS-N electrical or OC-N signal form a single error monitoring facility capable of measuring bit error rates (up to $10^{-3}$) independent of the value of N. The APS Channel bytes K1 and K2 are located in the first STS-1 of an STS-N, and are used on the protection line for Automatic Protection Switching (APS) signaling between line terminating equipment that uses line level protection switching (e.g., in systems using linear APS, or in Bi-directional Line Switched Rings). The K2 byte is also used to detect line AIS (AIS-L) and line Remote Defect Indication (RDI-L) signals.

The line Data Communication Channel bytes D4 through D12 are located in the first STS-1 of an STS-N, and are used for line data communication. These nine bytes effectively provide a message-based channel (576 kilobits per second) for alarms, maintenance, control, monitoring, administering and other communication needs. This channel is used for internally generated, externally generated and supplier-specific messages. The Synchronization Status byte S1 is located in the first STS-1 of an STS-N. Bits 5 through 8 of this byte are allocated to convey the synchronization status of the corresponding network element. The REI-L bytes M0 and M1 are allocated for a Line Remote Error Indication (REI-L) function (given an electrical physical signal) that conveys the error count detected by line terminating equipment (using the line BIP-8 code) back to its peer line terminating equipment. The Orderwire byte E2 is located in the first STS-1 of an STS-N, and is used for an Express Orderwire (EOW) channel between line entities.

The overhead fields and their respective descriptions for an OTN frame are defined in ITU-T G.709. Many of the SONET management capabilities are being duplicated within the OTN environment. For example, path and section error monitoring (PM and SM), general communication channel (GCC) and automatic protection switching (APS) are also being provisioned in SONET. Thus, in protecting SONET frames with FEC using OTN frame format, many of the management functionalities of SONET are duplicated and not utilized. This situation could be avoided by using a SONET framing scheme rather than a separate framing scheme such as the OTN frame format.

What is needed, therefore, are techniques for protecting SONET frames with FEC using SONET framing. Such techniques could also be employed for protecting SDH frames with FEC using SDH framing.

SUMMARY OF THE INVENTION

Techniques for applying forward error correction to optical communication signals such as those of SONET and SDH systems are provided. Existing framing structures associated with the particular optical communication system and protocol are utilized, and a separate framing for the forward error correction framing is not required. The techniques are independent with respect to the particular error correction coding method being used. Moreover, established management infrastructure associated with the given communication system can be used to manage the encoded data. Thus, a separate management layer is not necessary.

The features and advantages described herein are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3 illustrates the transport overhead byte designations of a conventional SONET system.

DETAILED DESCRIPTION OF THE INVENTION

Figure 4:
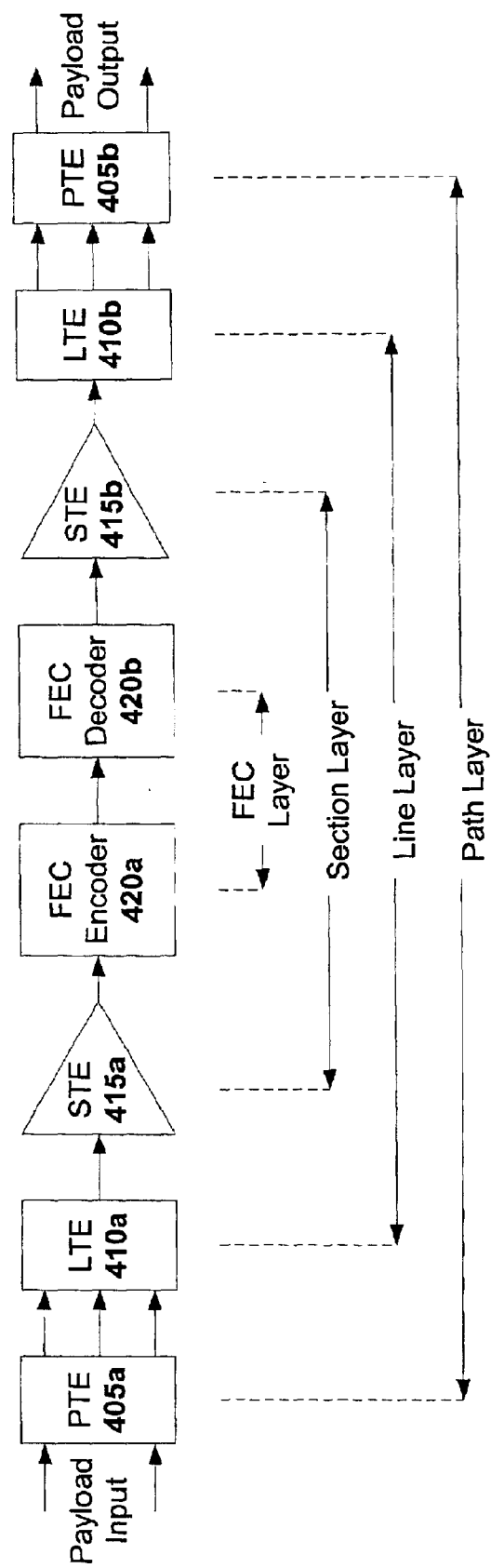
FIG. 4 illustrates a SONET system in accordance with one embodiment of the present invention.

FIG. 4 illustrates a SONET system in accordance with one embodiment of the present invention. The system includes path terminating equipment (PTE) modules 405, line terminating equipment (LTE) modules 410, section terminating equipment (STE) modules 415 and FEC encoding modules 420. The SONET system has a transmitting node (modules designated with "a") and a receiving node (modules designated with "b") communicatively coupled by a transmission line or other medium.

Figure 1:
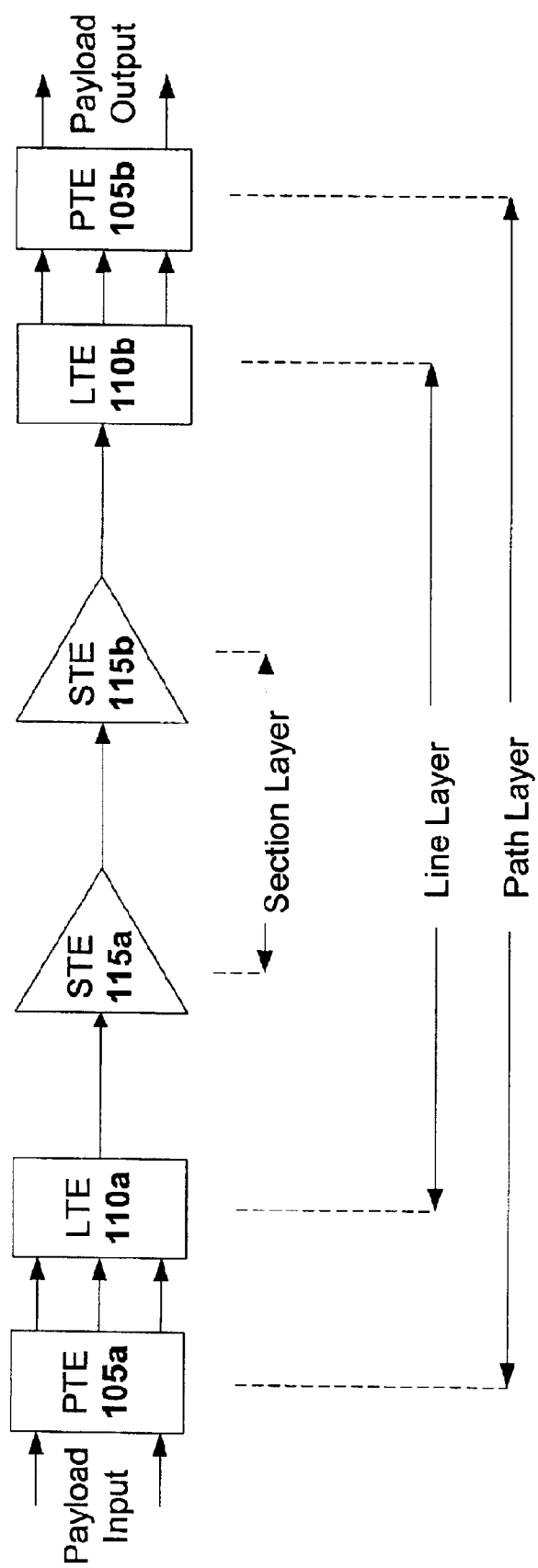
FIG. 1 illustrates a conventional SONET system.
Figure 2:
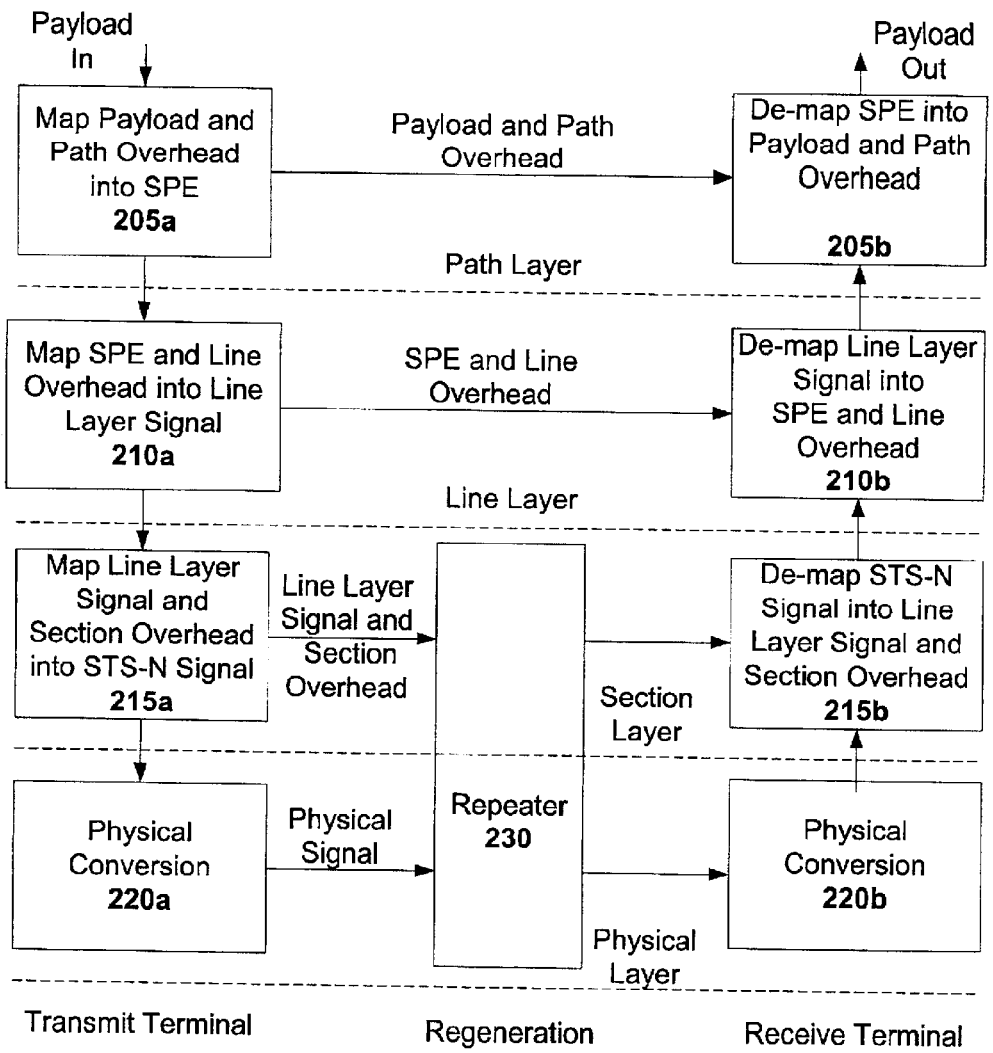
FIG. 2 illustrates the operation of a conventional SONET system.

The operation of path, line and section terminating equipment (PTE, LTE and STE modules) can be, for example, similar to the corresponding PTE, LTE and STE components discussed in reference to FIG. 1. Other configurations will be apparent in light of this disclosure. For example, a network element can be both line terminating equipment and path terminating equipment if, for example, some SPEs pass through the network element transparently and others are terminated. The terms PTE and LTE are generally used to refer to path terminating and line terminating functions in a network element.

FEC Encoder/Decoder and FEC Layer

Figure 9:
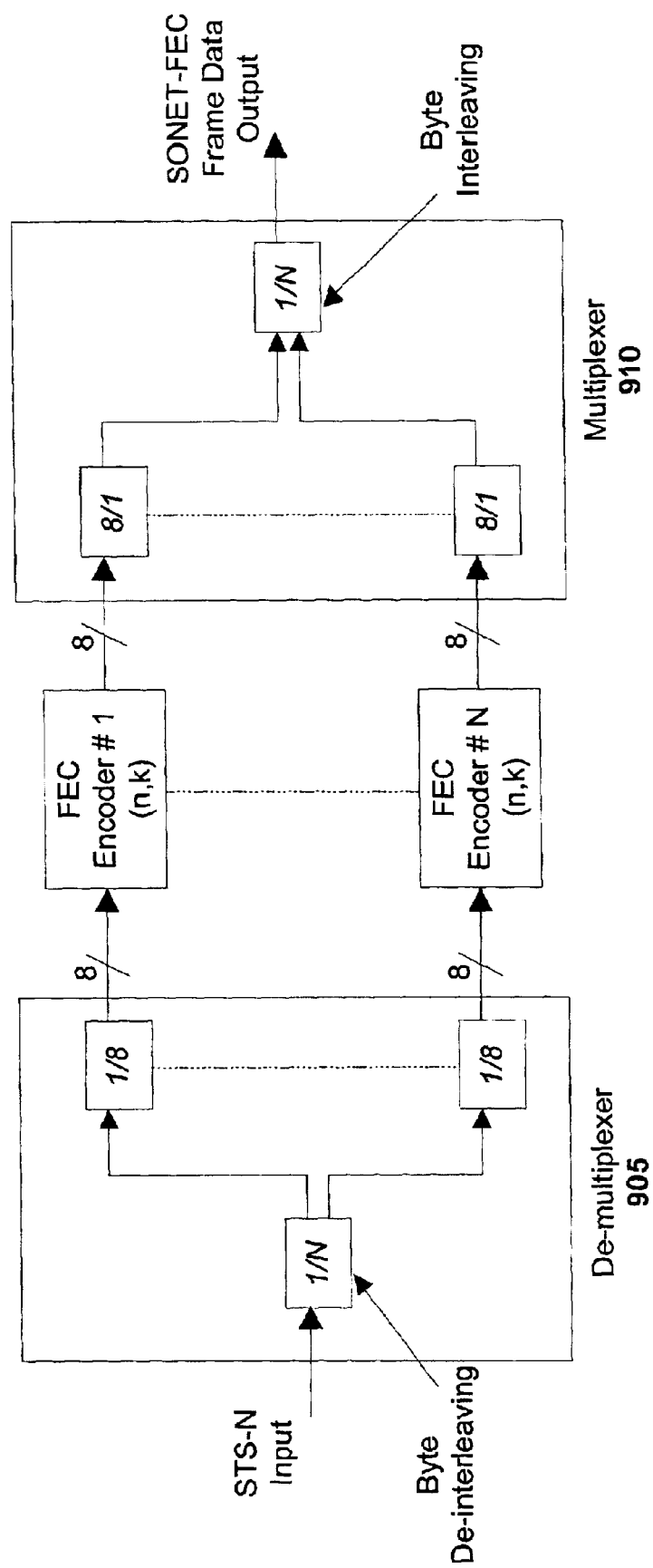
FIG. 9 illustrates an FEC coding architecture that can be employed in accordance one embodiment of the present invention.

The FEC coding modules 420 are network elements that encode (420a) and decode (420b) section layer signals such as STS-N, OC-N or STM-M signals pursuant to a FEC coding scheme. The FEC encoder module 420a receives the section layer signal and adds redundancy bytes (also referred to as parity bytes) according to a prescribed rule thereby producing encoded data at a higher bit rate. In addition, the FEC encoder module 420a can perform segmenting, scrambling and interleaving. The FEC decoder module 420b performs error correction while removing the added redundancy, and yields the section layer data that was encoded by the FEC encoder module 420a. The FEC decoder module 420b can also perform desegmenting, descrambling, and deinterleaving. The FEC coding modules 420 can be implemented in hardware, software, firmware or any combination thereof. For example, each of the FEC coding modules 120 can be implemented as an application specific integrated circuit or a chip set. Alternatively, the FEC coding modules 120 can be implemented by a set of software instructions or codes executing on a digital signal processor (DSP) or other suitable high-speed processing environment. An example architecture for FEC coding modules 420a and 420b is illustrated in FIG. 9.

Figure 5A:
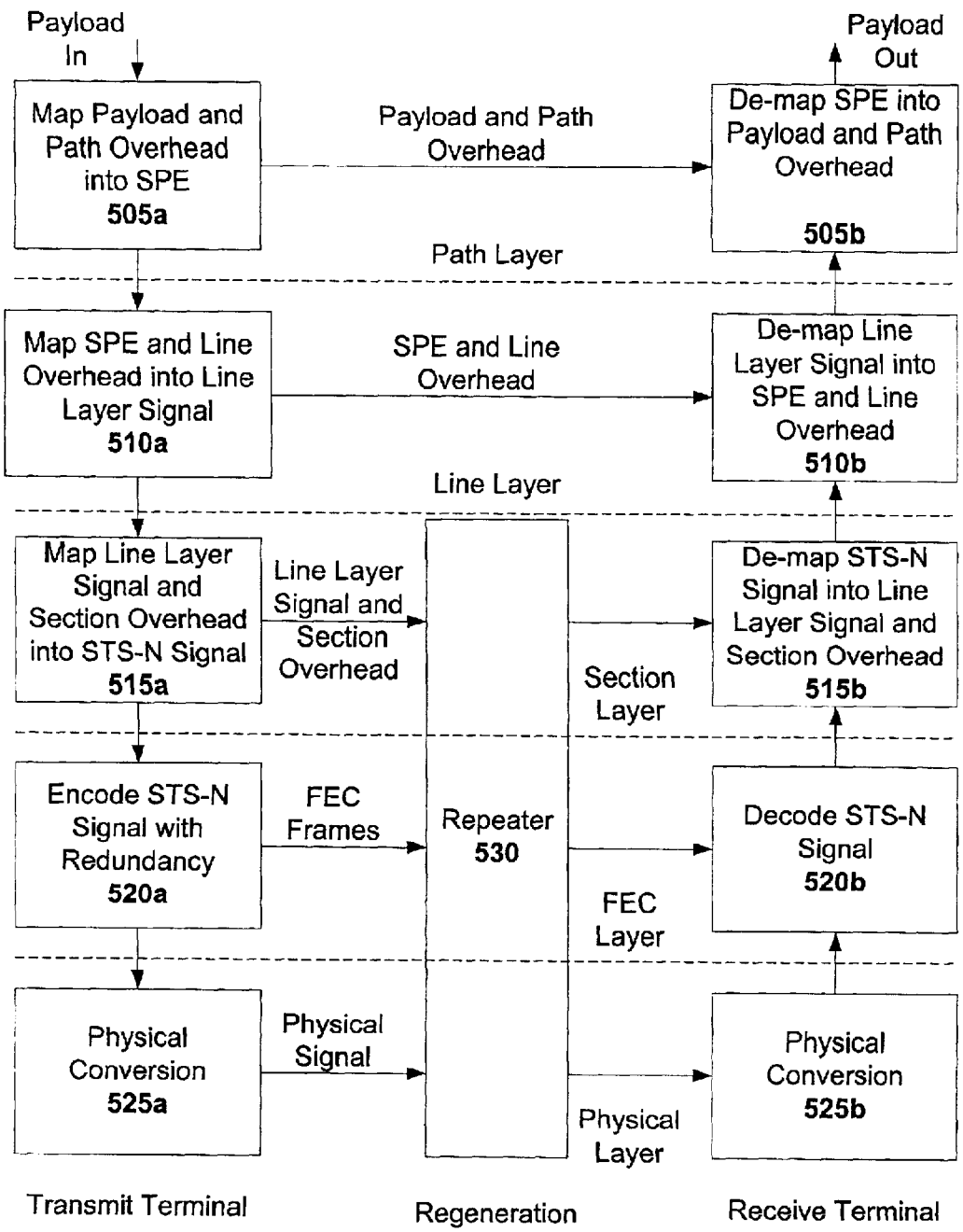
FIG. 5a illustrates a SONET-FEC reference model in accordance with one embodiment of the present invention.
Figure 5B:
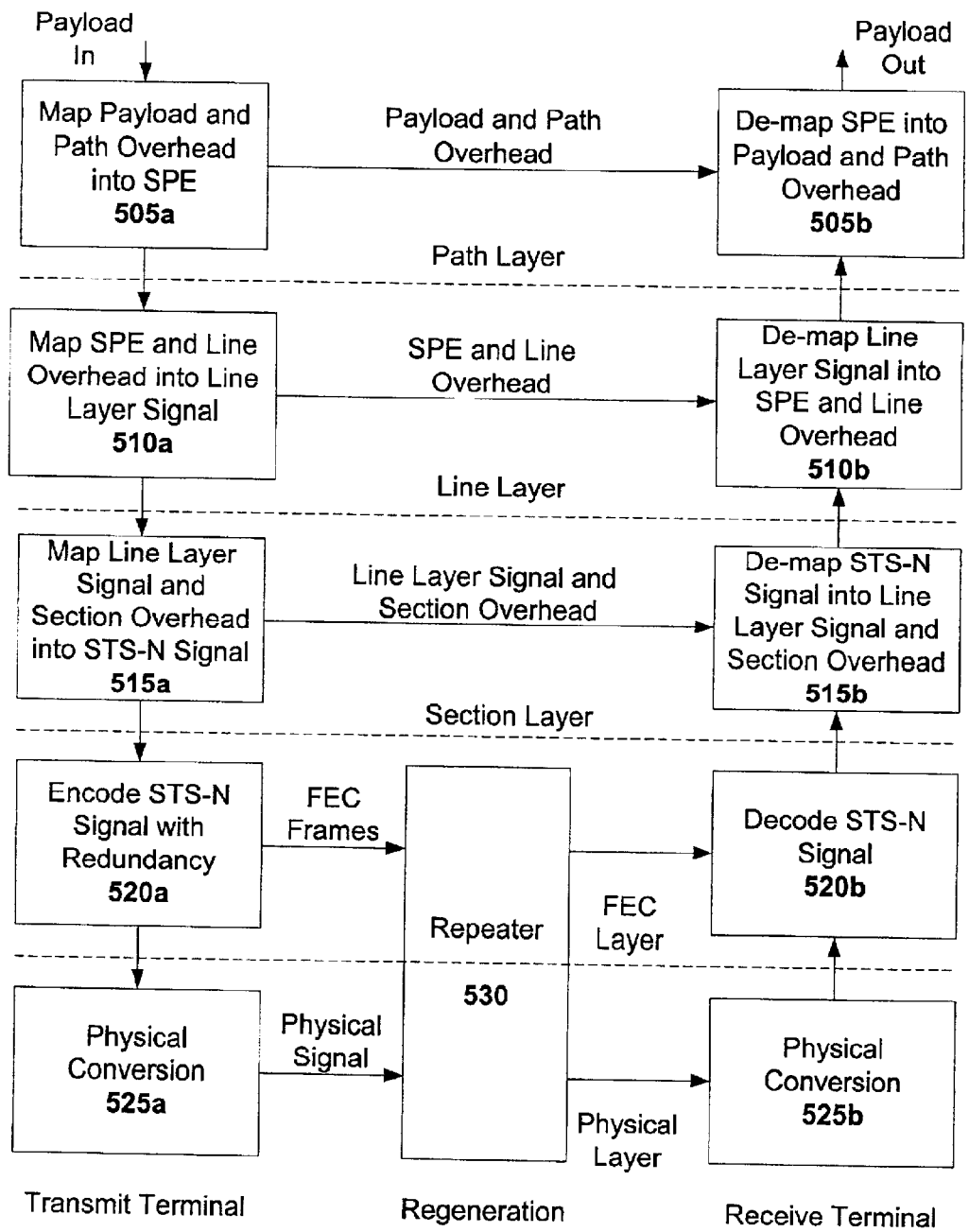
FIG. 5b illustrates a SONET-FEC reference model in accordance with another embodiment of the present invention.

In the embodiment shown in FIG. 4, the FEC layer sits below the SONET section and line layers and provides service to section layer. In addition, the FEC layer can provide, for example, performance monitoring functions. If section management functionality is needed, both FEC and section layers can be terminated as in a typical 3R regenerator. This application is further illustrated in FIG. 5a, which shows a SONET-FEC reference model having section layer termination at the repeater in accordance with one embodiment of the present invention. Note that if line management is not required, then only the FEC layer has to be terminated. This application is further illustrated in FIG. 5b, which shows a SONET-FEC reference model without the section layer termination at the repeater in accordance with another embodiment of the present invention. In such an application, line monitoring can be achieved using the error statistics provided by the FEC layer's performance monitoring.

SONET-FEC Frame Format

Figure 6:
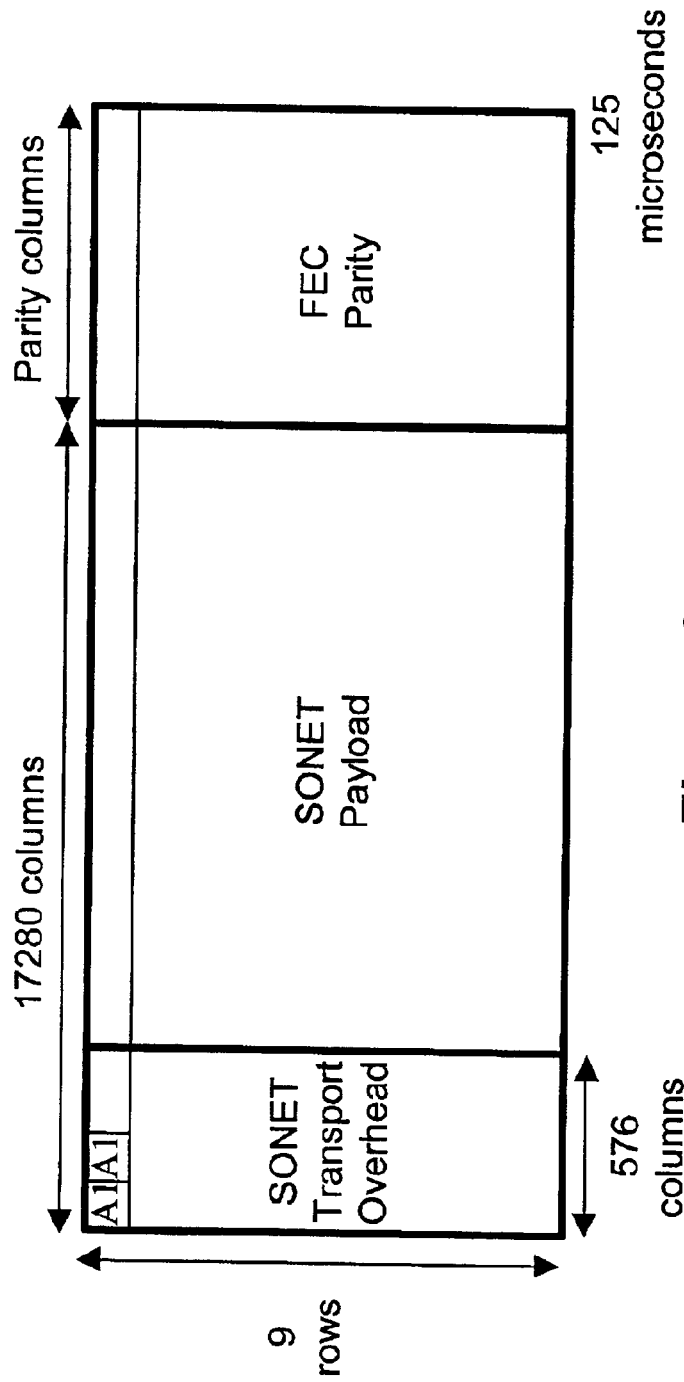
FIG. 6 illustrates a general SONET-FEC frame format in accordance with one embodiment of the present invention.

FIG. 6 illustrates a general SONET forward error correction frame format in accordance with one embodiment of the present invention. This example embodiment assumes the SONET interface signal is an STS-192 signal, and is based on the frame structure of a SONET STS-1 signal. An STS-1 signal has a specific sequence of 810 bytes (6480 bits), which includes various overhead bytes and an envelope capacity for transporting payloads. The frame structure of an STS-1 signal typically has a 90 column by nine row structure, where each column is one byte (i.e., 8 bits wide). Given a frame length of 125 $\mu$s (i.e., 8000 frames per second), the STS-1 signal has a bit rate of 51.840 Mbps. The order of transmission of bytes is typically row-by-row, from left to right. The framing for an STS-1 is one column of A1 characters followed by one column of A2 characters.

Given this frame structure for a base signal STS-1, the frame structure for an STS-192 signal therefore has 17280 columns (90 times 192) and 9 rows. The framing for an STS-192 is 192 A1 characters followed by 192 A2 characters where A1 is "0xF6" and A2 is "0x28." In one embodiment of the present invention, forward error correction is applied to each row independently, and the corresponding parity bytes for that row are added to the end of the same row. The transmitted SONET-FEC frame thus includes nine rows, and a number of parity columns appended to the end of the original 17280 columns. Note the transmission time of each frame is equal to 125 microseconds (assuming a frame rate of 8000 frames per second). As a result, the bit rate normally associated with an STS-192 signal (9953.28 Mbps) is increased by a factor of (17280+number of parity columns)/17280. In a more general sense, the bit rate of any STS-N signal is increased by a factor of ((90*N)+number of parity columns)/(90*N).

Note that the framing format is independent with respect to the particular FEC encoding scheme employed. Thus, for example, Reed-Solomon encoding, BCH encoding (developed by Bose, Chaudhuri, and Hocquenghem), or other binary block error correcting coding schemes can be used to effect the forward error correction. Convolutional coding schemes can be employed here as well. The particular coding scheme employed depends on factors such as the desired error performance, the available bandwidth, and system complexity.

Both the non-payload data (FEC parity bytes and overhead bytes) and the payload are scrambled (with the exception of the framing bytes A1 and A2 and the section tracing byte J1). Note that the scrambling function associated with the section layer can be supplemented or replaced by a scrambling function of the FEC layer in the embodiment where the FEC layer is below the section and line layers, such as that shown in FIG. 4.

The receiving node carries out a frame alignment procedure. This procedure can be implemented, for example, in accordance with frame alignment methods employed by SONET framers, or any suitable frame alignment techniques. After the frame alignment, the input payload is de-scrambled and the corresponding parity and payload bytes for each frame are used to form the FEC frames. Each of the FEC frames is then decoded to correct possible errors introduced by the optical channel. A decoding failure is declared if it is not possible to correct all the errors within that frame.

In an embodiment of the present invention where the FEC layer is below the line and section layers (e.g., as illustrated in FIG. 4), the generation and insert/drop functionalities for each of the transport overhead bytes is as specified in the applicable standards (e.g., ANSI T1.105-1995 and Telcordia GR-253-CORE). For example, both byte B1 (of the section layer overhead) and byte B2 (of the line layer overhead) are calculated before FEC encoding is applied at the transmitting node, and do not cover parity bytes generated by the FEC layer. In this sense, the generation and insert/drop functionalities associated with each of the transport overhead bytes is executed before the FEC layer encoding process. At the receiving node, however, the B1 and B2 counts are calculated after the FEC decoder has corrected some of the errors within the SONET payload. The line monitoring functions provided by the section and line layers, therefore, report the effective line conditions incorporating the bytes as corrected by the FEC layer. For instance, the bit error estimated using a BIP-8 algorithm provides an estimate of the line condition as improved by the FEC coding process. Note that if it is required to monitor the line condition before the FEC has corrected some of the errors, then FEC layer performance monitoring can be employed. Further note that the LTE modules calculate line layer overhead bytes (e.g., B2), while the STE modules calculate section overhead bytes (e.g., byte B1).

Alternative SONET-FEC Configuration

Figure 7:
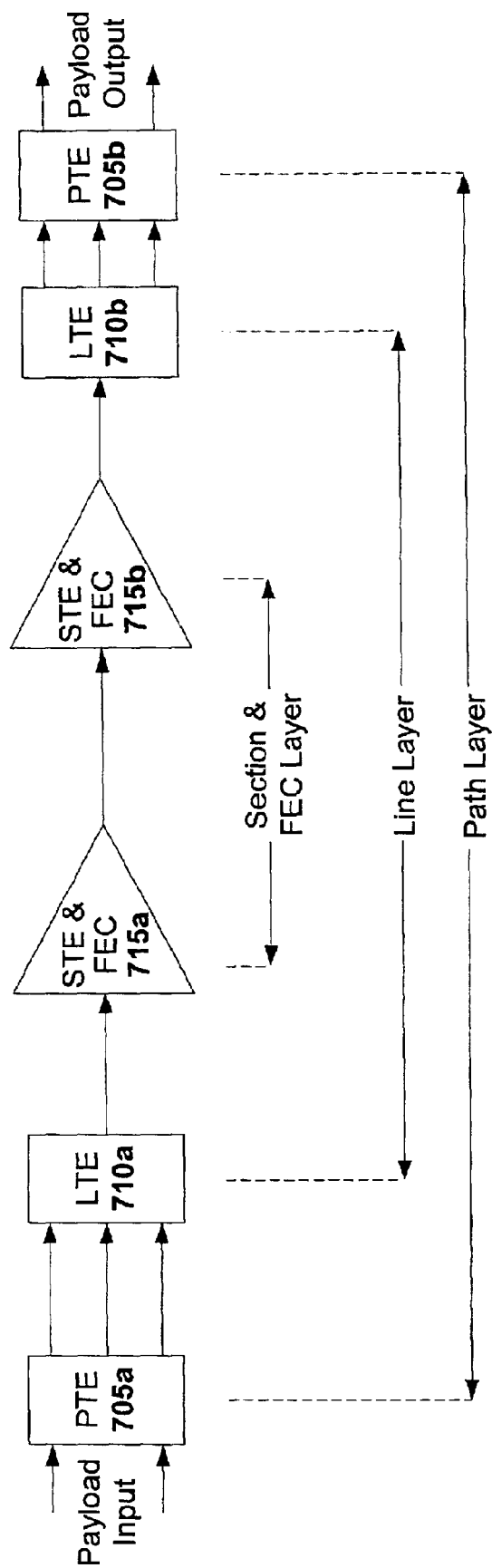
FIG. 7 illustrates a SONET system in accordance with another embodiment of the present invention.

Other embodiments and configurations are possible in light of this disclosure. For example, FIG. 7 illustrates a SONET system in accordance with another embodiment of the present invention. This embodiment combines the operations of the FEC and STE modules into one module. In such an embodiment, the FEC and STE layers are effectively combined into one layer that is referred to herein as the section & FEC layer.

In this embodiment, at the transmitting node, the FEC encoding operation is performed before the calculation of the B1 byte. As such, the B1 byte calculation includes all the parity columns generated by the FEC encoding process of module 715a. At the receiving node, however, the B1 count is calculated before applying FEC decoding, and the bit error estimated using the BIP-8 algorithm provides an estimate of the actual line condition. Thus, in this case, the bit error estimated using BIP-8 does not take into consideration those bytes that are corrected by virtue of the FEC decoding process. This is in contrast to an embodiment where the FEC operation is performed after calculation of the B1 byte at the transmitting node (and before calculation of the B1 byte at the receiving node).

Figure 8A:
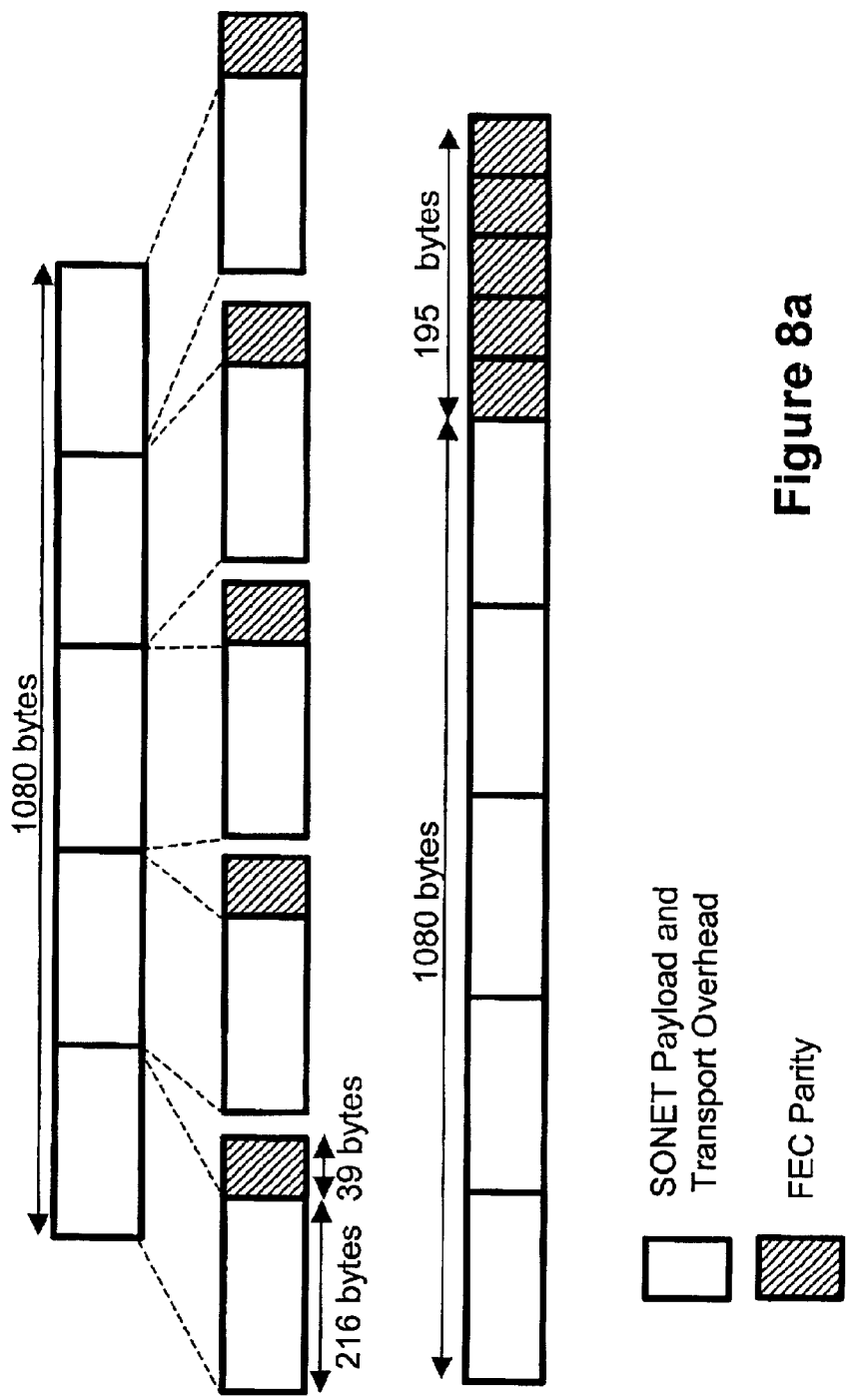
FIGS. 8a through 8c illustrate a specific SONET-FEC frame format in accordance with one embodiment of the present invention.
Figure 8B:
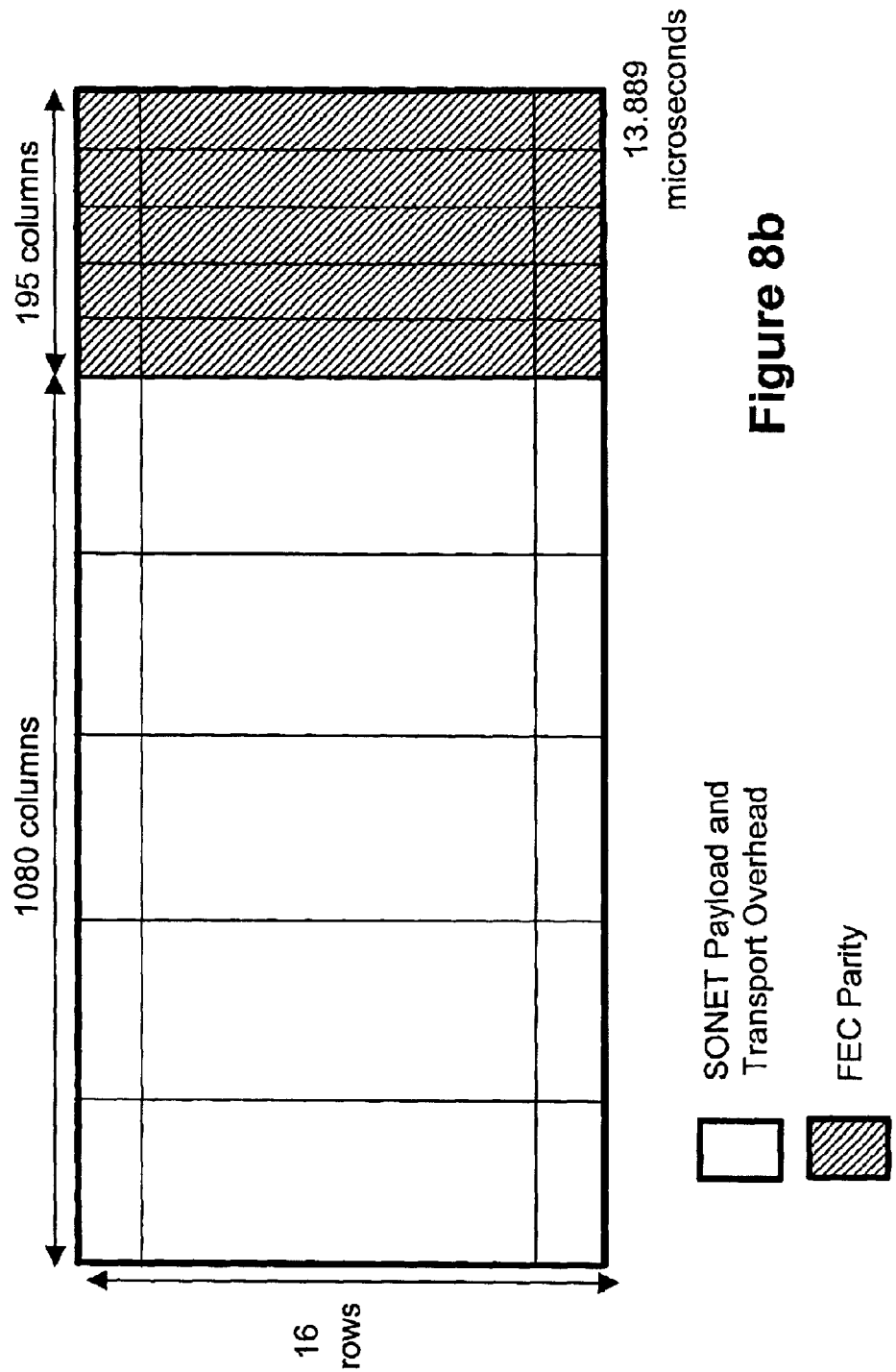
Figure 8C:
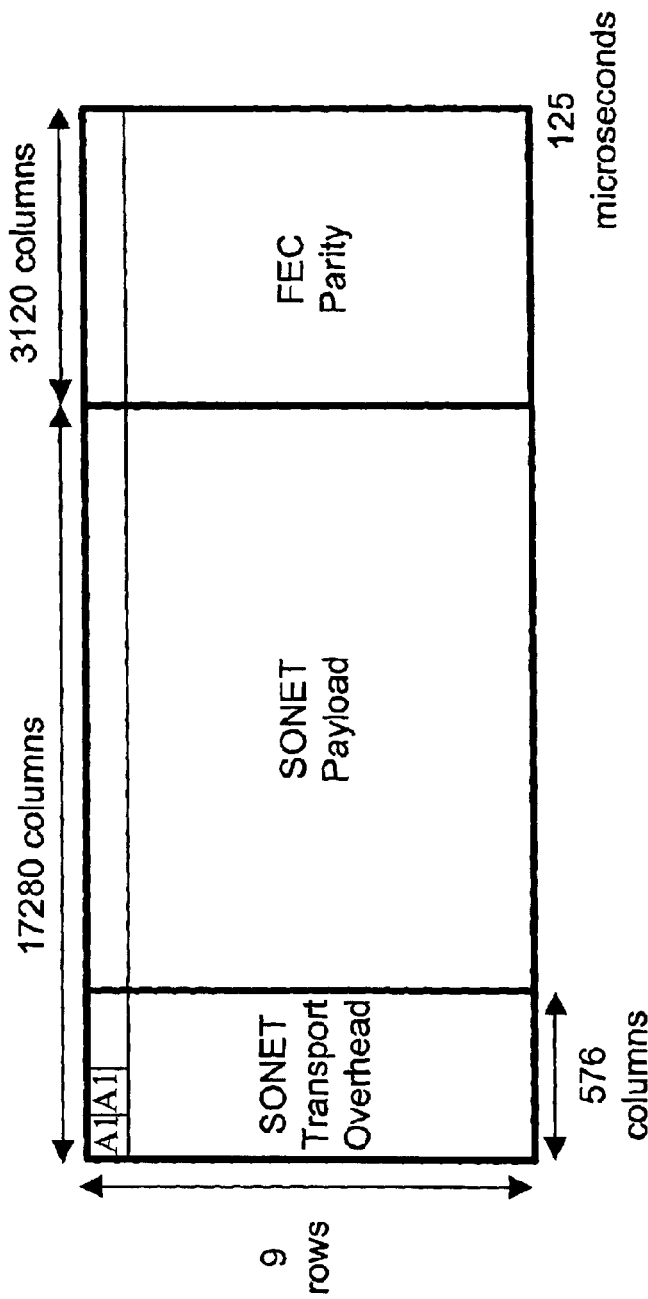

FIGS. 8a through 8c illustrate a specific SONET forward error correction frame format in accordance with one embodiment of the present invention. This example frame format assumes a SONET interface signal of STS-192 and an interleaving depth of 16, and a Reed Solomon FEC coding scheme of RS (255, 216). In addition, the encoding scheme was selected so that each row of the STS-192 frame can be coded independently of the other rows thereby simplifying the decoding process. Note, however, that the principles of the present invention can be applied in numerous applications with other interface signals (e.g., SONET STS-N or SDH-M), interleaving depths, and FEC coding schemes (e.g., RS (n, k, where integer k bits<integer n bits)) as will be apparent in light of this disclosure. The described functionality in generating the frame can be carried out by a FEC coding module (e.g., software executing on a DSP or a high speed silicon process).

Those skilled in the art understand that a typical Reed Solomon code operates on an odd number of bytes. As such, the coding scheme described above, RS (255, 216), in actuality is RS (255, 217), where 216 bytes of data and one null byte (sometimes referred to as a zero pad byte) are encoded. To ease the coding process, the coding scheme is typically selected so as to provide an integer number of data chunks of the data string being coded. Note that in this particular example, each data string to be coded is one row of a STS-192 frame, where each row has 17280 bytes. Dividing 17280 by 216 provides 80 data chunks. Assuming an RS decoder that has the ability to correct up to 19 bytes of channel errors, the closest available Reed-Solomon coding scheme is RS (255, 217). The extra null byte (byte 217) is effectively ignored in the coding process. For purposes of discussion, therefore, the description herein is given in the context of a RS (255, 216) encoding scheme, and the additional null byte disregarded. Note, however, that other embodiments may have additional null bytes/bits, or no null bytes/bits depending on factors such as the size of the data string to be coded, type of coding methods employed, and the desired system complexity.

FIG. 8a illustrates the process of concatenating the payload and parity bytes of FEC sub-frames into data string (corresponding to one row of the interleaver) in accordance with one embodiment of the present invention. Recall that each row of an STS-192 includes 17280 bytes (90 byte width columns*192). Given an interleaving depth of 16, each row of the STS-192 signal is segmented into 1080 byte chunks (17280/16). With k of the selected encoding algorithm (less any null bytes) equal to 216, each 1080 byte chunk is segmented into five 216 byte segments. Thus, the total number of 216 byte segments per row is eighty. Each 216 byte segment is then passed through the RS encoder (255, 216) that results in an extra 39 bytes of parity by virtue of the selected coding scheme. Thus, the produced FEC sub-frames include 216 bytes of payload (which may also include overhead as well) and 39 bytes of redundancy, also referred to as parity. Note that these added parity bytes enable the corresponding RS decoder to correct up to 19 bytes (⌊39/2⌋) of channel errors. The 216 byte segments and corresponding 39 bytes of parity of five consecutive FEC sub-frames are concatenated separately as shown in FIG. 8a This corresponds to one row of interleaver data input as will be further discussed in reference to FIG. 8b.

FIG. 8b illustrates the interleaver data input format in accordance with one embodiment of the present invention. The concatenation of the non-parity bytes (e.g., payload) and parity bytes as shown in FIG. 8a generates a data segment of 1080 bytes of payload followed by 195 bytes of parity. Thus, the resulting data segment of this example is 1275 bytes long. Note that 16 of these data segments (shown as 16 rows in FIG. 8b) effectively correspond to one row of the original SONET frame along with the added parity bytes. Each of these 16 data segments is consecutively applied to the interleaver function in an established fashion (e.g., row by row, left to right). Further note that 13.899 microseconds corresponds to the delay introduced as a result of the interleaving operation. This delay typically constitutes the main component of the overall delay. The interleaving function can be included in the FEC encoding module (e.g., as illustrated by 420a and 420b of FIG. 4), but can alternatively be employed as a separate chip (e.g., ASIC or other high speed silicon process) or module (e.g., a software routine called by the coding algorithm executing on a DSP).

This particular embodiment allows each row of the original SONET frame to be decoded independently of the other rows. However, the present invention is not intended to be limited to such embodiments and other coding schemes will be apparent in light of this disclosure. For example, all 155,520 bytes of the 17280 column, 9 row SONET frame structure can be coded together. In such an embodiment, however, note that it is not possible to start the decoding procedure before an entire SONET frame is received FIG. 8c illustrates the resulting SONET-FEC frame format. The output of the interleaver in this embodiment equates to one row of the STS-192 signal, where each row is 17280 bytes long followed by 3120 of the corresponding parity bytes. The final SONET-FEC frame is comprised of nine consecutive rows as demonstrated in FIG. 8c, where each row can be transmitted separately. Note that the final frame comprises the original SONET frames padded by 3120 parity columns. Similar to a SONET frame, this SONET-FEC frame corresponds to 125 microseconds of data thereby implying an increased bit rate of 11.7504 Gbps. This corresponds to the normal bit rate of a SONET STS-192 signal (9953.28 Mbps) multiplied by the coding factor, where the coding factor is calculated by ((90*N)+number of parity columns)/(90*N), or (17280+3120)/17280. In a similar vein, the coding factor can be calculated by the dimensionless ratio of n/k, where n and k are specified by the coding scheme, such as RS (255, 216), where k equals 216 and n equals 255. Generally stated, k is the pre-encoding block length (less any null bytes), and n is the post-encoding block length. The coding factor for this particular example is 1.180555555556.

A FEC encoder architecture such as the one shown in FIG. 9 can be used to carry out the FEC coding scheme in accordance with embodiments of the present invention. As can be seen, a digital de-multiplexer module 905 and a multiplexer module 910 are used before and after the encoding stage, respectively. The multiplexer module 910 implements the interleaving operation having an interleaving depth of N. The de-multiplexer module 905, on the other hand, provides the necessary symmetry (between the encoder and the decoder) needed for data integrity. At the transmitting node, the STS-N signal is received and passed through a de-multiplexer module 905 to implement a de-interleaving stage for symmetry purposes thereby resulting in N parallel signals. After passing these signals through a bank of N FEC encoders, they are multiplexed back to the original signal by a multiplexor module 910. The resulting SONET-FEC frame data is provided at the encoder output. Note that the bit rate of the SONET-FEC frame data is equal to the input signal bit rate multiplied by the coding rate (n/k). Further note that such an encoder architecture would operate similarly on an STM-N signal of an SDH system thereby producing an SDH-FEC frame at the encoder output.

With regards to the receiving node, a similar architecture can be employed for the FEC decoder. More specifically, the decoder architecture (not shown) can employ the same multiplexer and de-multiplexer modules used in conjunction with a bank of FEC decoders (as opposed to FEC encoders). The received SONET-FEC frame data is first passed through a de-multiplexer module 905 to implement the de-interleaving stage thereby resulting in N parallel signals. After passing these signals through a bank of N FEC decoders, they are multiplexed back to the original STS-N signal by a multiplexor module 910. Note that the original bit rate of the STS-N input is restored. Further note that if the FEC decoding functionality at the receiving node is not implemented for whatever reason, the last 3120 bytes can be skipped or otherwise ignored and the original SONET frame can be recovered. In this sense, the principles of the present invention provide backwards compatibility. Such decoder architecture would operate similarly on an SDH-FEC frame of an SDH system thereby producing an STM-N signal at the decoder output.

Figure 10:
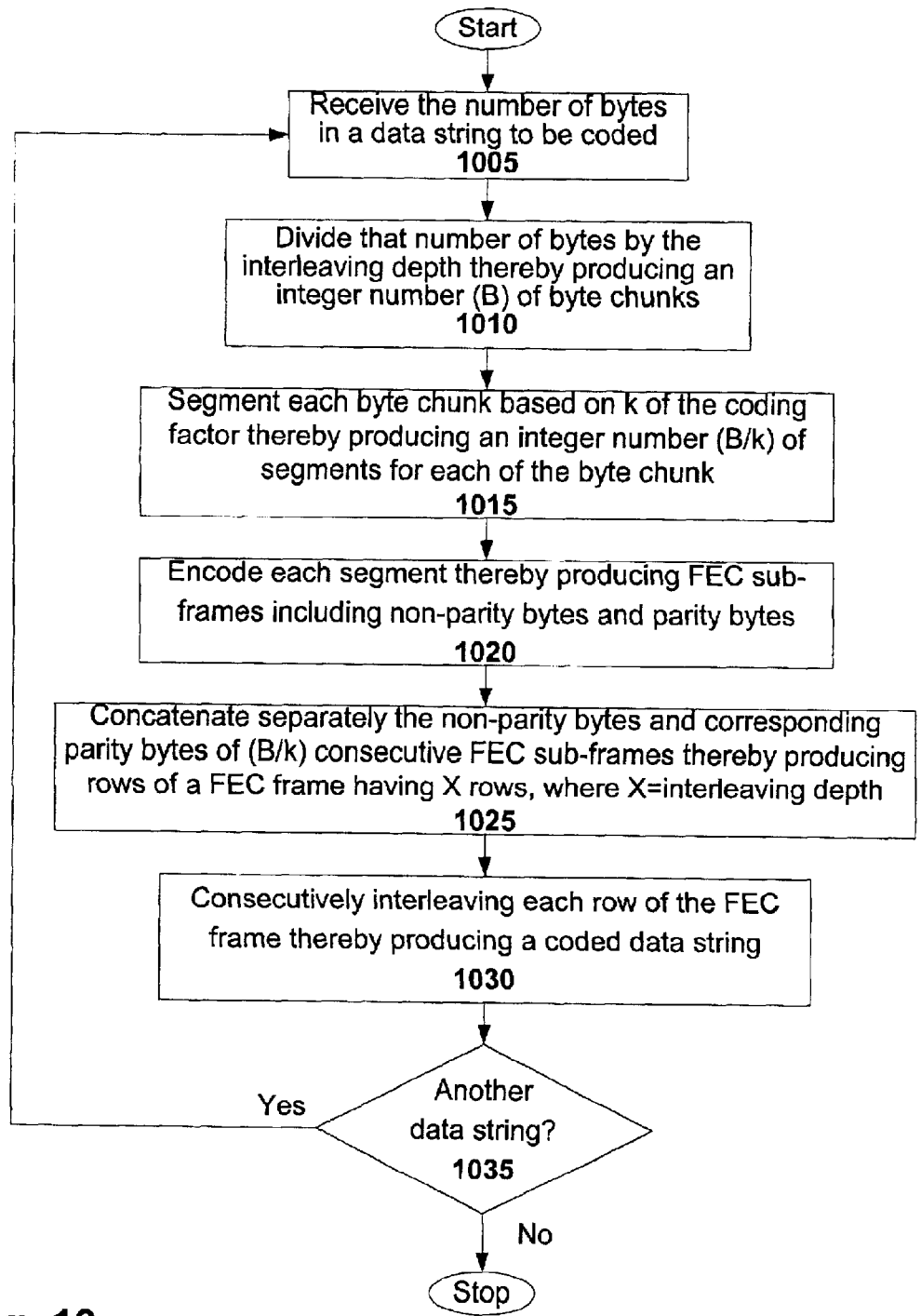
FIG. 10 illustrates a method for performing FEC in a SONET system in accordance with one embodiment of the present invention.

FIG. 10 illustrates a method for performing forward error correction in a SONET system in accordance with one embodiment of the present invention. This method can be carried out, for example, by a FEC coding module (e.g., 420 of FIG. 4 or FIG. 9 generally) implemented by a suitable processing environment (e.g., ASIC or other high speed silicon process). Other embodiments and configurations will be apparent in light of this disclosure, and the present invention is not intended to be limited to any one embodiment or configuration. Generally, it is assumed that the coding scheme parameters (such as the coding factor of n/k and the interleaving depth) are known, as well as the frame structure of the system in which the method operates. For discussion purposes, assume the interleaving depth is 16 and the coder is an RS (n=255, k=216) thereby providing a coding factor of 255/216. The coding factor ignores null bytes. Note that systems other than SONET systems, such as SDH systems, can also employ this method as will be apparent in light of this disclosure.

The method begins with receiving 1005 a number of bytes in a data string to be coded. In one embodiment, this is the number of bytes in one row of a SONET STS-N frame (e.g., 17280 bytes of an STS-192 signal). In such an embodiment, each row of the input frame is therefore coded independently of the other rows of that frame. In alternative embodiments, the number of bytes in a data string might be the total number of bytes in all rows of a SONET frame structure, or some subset of those bytes. For ease of implementation, the number of bytes in the data string to be coded should produce an integer when divided by the interleaving depth. The method continues with dividing 1010 the number of bytes by the interleaving depth thereby producing an integer number (B) of byte chunks (e.g., B=17280/16=1080).

The method further includes segmenting 1015 each byte chunk based on k (less any null bytes) of the coding factor thereby producing an integer number (B/k) of segments (e.g., 1080/216=5). Note there are 16 byte chunks in this example. The method proceeds with encoding 1020 each segment thereby producing FEC sub-frames including non-parity bytes and parity bytes. The example illustrated in FIG. 8a, for instance, shows FEC sub-frames having 216 non-parity bytes and 39 parity bytes. Note that for one 17280 byte row of a SONET STS-192 frame, there are eighty such FEC sub-frames.

The method further includes concatenating 1025 separately the non-parity bytes and corresponding parity bytes of (B/k) consecutive FEC sub-frames thereby producing rows of a FEC frame having X rows, where X is equal to the interleaving depth. Continuing with the demonstrated example of FIG. 8a, B/k is equal to 1080/216, which is five. Thus, 216 non-parity bytes from each of five consecutive FEC sub-frames are concatenated, and 39 parity bytes from each of those same consecutive FEC sub-frames are concatenated and then appended to the end of the concatenated non-parity bytes. The resulting row of the FEC frame in this example, therefore, has 1080 non-parity byte columns and 195 parity byte columns for a total of 1275 bytes. Note there are 16 such rows in this example as illustrated by FIG. 8b.

The method proceeds with consecutively interleaving 1030 each row of the FEC frame thereby producing a coded data string. The resulting output of the interleaver in this example is illustrated by FIG. 8c, where the coded data string represents one row of a SONET frame STS-192 signal having 17280 non-parity byte columns and 3120 parity byte columns. Note that each row of such a SONET frame is coded independently. The method may proceeds with determining 1035 if there is another data string to process. If so, the method may repeat 1005 through 1035. If no, then the method terminates. The resulting frame structure is further illustrated in FIG. 8c, which shows all nine rows of non-parity and parity columns.

At the receiving node, the method may further include functions that are complementary to the functions of the transmitting node as will be apparent in light of this disclosure. For example, the method may include receiving a coded data string forming a row of a SONET-FEC frame. In an embodiment where the operations of the FEC and STE layers are combined into a Section & FEC layer (e.g., as in FIG. 7), the method may further include estimating bit error using a BIP-8 algorithm thereby characterizing transmission line conditions without the benefit of the forward error correction. The method may further include de-interleaving the coded data string thereby creating X rows of a FEC frame (where X equals the interleaving depth), and decoding each FEC frame in accordance with the coding scheme thereby producing decoded data stings. The method proceeds with interleaving the decoded data strings thereby forming a row of a SONET frame. Thus, the original SONET frame that was transmitted is recovered at the receiving node.

In an embodiment where the FEC layer is below the line and section layers (e.g., as in FIG. 4), however, the method at the receiving node may include receiving a coded data string forming a row of a SONET-FEC frame, and de-interleaving the coded data string thereby creating X rows of a FEC frame (where X equals the interleaving depth). The method may further include decoding each FEC frame in accordance with the coding scheme thereby producing decoded data stings. Then, the method proceeds with estimating bit error using a BIP-8 algorithm thereby characterizing transmission line conditions as improved by the forward error correction, and interleaving the decoded data strings thereby forming a row of a SONET frame. Again, the original transmitted SONET frame is recovered at the receiving node.

The foregoing description of the embodiments of the invention has been presented for the purposes of illustration and description. It is not intended to be exhaustive or to limit the invention to the precise form disclosed. Many modifications and variations are possible in light of this disclosure. For example, the principles and concepts underlying the present invention may be employed by other optical transport systems (such as SDH systems), and need not be limited to SONET systems. In addition, numerous coding algorithms can be employed, and need not be limited to any one particular code. It is intended that the scope of the invention be limited not by this detailed description, but rather by the claims appended here.

What is claimed is:

1. A method for performing forward error correction in a SONET system, wherein a coding scheme associated with the forward error correction has a coding factor of (n/k) and an interleaving depth, the method comprising:

receiving a data string to be coded, the data string having a number of bytes;

dividing the number of bytes by the interleaving depth thereby producing B byte chunks;

segmenting each byte chunk based on k of the coding factor thereby producing a number of segments;

encoding each segment in accordance with the coding scheme thereby producing consecutive FEC sub-frames, each FEC sub-frame including non-parity bytes and parity bytes;

concatenating separately the non-parity bytes and corresponding parity bytes of (B/k) consecutive FEC sub-frames thereby producing rows of a FEC frame having X rows, where X is equal to the interleaving depth; and consecutively interleaving each row of the FEC frame thereby producing a coded data string.

2. The method of claim 1 wherein the method is carried out by a FEC coding module implemented by one or more application specific integrated circuits.

3. The method of claim 1 wherein the number of bytes included in the data string to be coded make up one row of a SONET STS-N input signal.

4. The method of claim 3 wherein the SONET STS-N input signal has a number of rows, and each row is coded independently of the other rows.

5. The method of claim 1 wherein the coded data string makes up one row of a SONET-FEC frame.

6. The method of claim 1 wherein the number B of byte chunks is an integer number of byte chunks.

7. The method of claim 1 wherein the number of segments produced is equal to (B/k).

8. The method of claim 1 wherein the coded data string represents one row of a SONET frame STS-N signal.

9. The method of claim 1 further comprising:
scrambling the coded data string; and
transmitting the scrambled coded data string.

10. The method of claim 1 further comprising:
in response to there being one or more additional data strings to be coded, repeating the method for each additional data string.

11. The method of claim 1 wherein the SONET system defines a number of operatively coupled functional layers including a line layer, a section layer, and a FEC layer, and the method operates in the FEC layer.

12. The method of claim 11 wherein the section and line layers are associated with transport overhead bytes, and each transport overhead byte is associated with generation and insert/drop functionality that is executed before the encoding of the FEC layer.

13. The method of claim 11 wherein the section layer is associated with an overhead byte B1 that is used for a section error monitoring function, and the line layer is associated with an overhead byte B2 that is used for a line error monitoring function, and both bytes B1 and byte B2 are each calculated using a BIP-8 algorithm before the encoding of the FEC layer.

14. The method of claim 11 wherein the SONET system has a transmitting node and a receiving node communicatively coupled by a transmission medium, and at the receiving node, transport overhead bytes B1 and byte B2 are each calculated using a BIP-8 algorithm after a FEC decoding process corresponding to the encoding of the FEC layer has been performed.

15. The method of claim 1 wherein the SONET system defines a number of operatively coupled functional layers including a line layer and a combined section & FEC layer, and the method operates in the section & FEC layer.

16. The method of claim 15 wherein the section & FEC layer is associated with transport overhead bytes, and each transport overhead byte is associated with generation and insert/drop functionality that is executed after the encoding of the section & FEC layer.

17. The method of claim 15 wherein the section & FEC layer is associated with an overhead byte B1 that is used for a section error monitoring function, and byte B1 is calculated using a BIP-8 algorithm after the encoding of the section & FEC layer.

18. The method of claim 15 wherein the SONET system has a transmitting node and a receiving node communicatively coupled by a transmission medium, and at the receiving node, transport overhead byte B1 is calculated using a BIP-8 algorithm before a FEC decoding process corresponding to the encoding of the FEC layer has been performed.

19. A method for performing forward error correction in one of a SONET system or an SDH system, wherein a coding scheme associated with the forward error correction has a coding factor of (n/k) and an interleaving depth, the method comprising:
receiving a data string to be coded, the data string having a number of bytes;
dividing the number of bytes by the interleaving depth thereby producing B byte chunks;
segmenting each byte chunk based on k of the coding factor thereby producing a number of segments;
encoding each segment in accordance with the coding scheme thereby producing consecutive FEC sub-frames, each FEC sub-frame including non-parity bytes and parity bytes;
concatenating separately the non-parity bytes and corresponding parity bytes of (B/k) consecutive FEC sub-frames thereby producing rows of a FEC frame having X rows, where X is equal to the interleaving depth; and
consecutively interleaving each row of the FEC frame thereby producing a coded data string.

20. A method for performing forward error correction in a SONET/SDH system, wherein a coding scheme associated with the forward error correction has a coding factor of (n/k) and an interleaving depth, the method comprising:
receiving a coded data string forming a row of a SONET/SDH-FEC frame;
estimating bit error using a BIP-8 algorithm thereby characterizing transmission line conditions without the benefit of the forward error correction;
de-interleaving the coded data string thereby creating X rows of a FEC frame, where X equals the interleaving depth;
decoding each FEC frame in accordance with the coding scheme thereby producing decoded data stings; and
interleaving the decoded data strings thereby forming a row of a SONET/SDH frame.

21. A method for performing forward error correction in a SONET/SDH system, wherein a coding scheme associated with the forward error correction has a coding factor of (n/k) and an interleaving depth, the method comprising:
receiving a coded data string forming a row of a SONET/SDH-FEC frame;
de-interleaving the coded data string thereby creating X rows of a FEC frame, where X equals the interleaving depth;
decoding each FEC frame in accordance with the coding scheme thereby producing decoded data stings;
estimating bit error using a BIP-8 algorithm thereby characterizing transmission line conditions as improved by the forward error correction; and
interleaving the decoded data strings thereby forming a row of a SONET/SDH frame.

* * * * *